(12) United States Patent
VanBlon et al.

(10) Patent No.: US 11,455,983 B2
(45) Date of Patent: Sep. 27, 2022

(54) OUTPUT PROVISION USING QUERY SYNTAX

(71) Applicant: Lenovo (Singapore) Pte. Ltd., Singapore (SG)

(72) Inventors: Russell Speight VanBlon, Raleigh, NC (US); Roderick Echols, Chapel Hill, NC (US); Ryan Charles Knudson, Durham, NC (US); Bradley Park Strazisar, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 351 days.

(21) Appl. No.: 16/687,434

(22) Filed: Nov. 18, 2019

(65) Prior Publication Data

US 2021/0151035 A1 May 20, 2021

(51) Int. Cl.
*G10L 15/183* (2013.01)
*G06F 16/65* (2019.01)
*H04L 51/02* (2022.01)
*G06F 16/632* (2019.01)

(52) U.S. Cl.
CPC .......... *G10L 15/183* (2013.01); *G06F 16/634* (2019.01); *G06F 16/65* (2019.01); *H04L 51/02* (2013.01)

(58) Field of Classification Search
CPC ..... G10L 15/183; G10L 15/26; G06F 16/634; G06F 16/65; G06F 16/632; G06F 40/211; H04L 51/02
See application file for complete search history.

(56) References Cited

U.S. PATENT DOCUMENTS

| | | | |
|---|---|---|---|
| 10,015,124 B2 * | 7/2018 | McGregor, Jr. | H04L 51/10 |
| 10,121,493 B2 * | 11/2018 | Aravamudan | G10L 25/54 |
| 2018/0129737 A1 * | 5/2018 | Louie | G06F 16/335 |
| 2021/0117456 A1 * | 4/2021 | Katz | G06F 16/3329 |

* cited by examiner

*Primary Examiner* — Linda Wong
(74) *Attorney, Agent, or Firm* — Ference & Associates LLC

(57) ABSTRACT

One embodiment provides a method, including: receiving, at an audio input device associated with an information handling device, an audible user query; identifying, using a processor, syntactic aspects of the audible user query; determining, based at least in part on the syntactic aspects and regardless of whether a trained answer to the audible user query is available, an answer responsive to the audible user query; and providing, using an output device associated with the information handling device, the answer. Other aspects are described and claimed.

16 Claims, 3 Drawing Sheets

OUTPUT PROVISION USING QUERY SYNTAX

BACKGROUND

Individuals frequently interact with their information handling devices ("devices"), for example laptop and/or personal computers, tablet devices, smart phones, smart speakers, and the like, throughout the day. More particularly, digital assistant software may be resident on a device that may detect user inputs and thereafter perform one or more responsive functions. For example, responsive to receiving an audible user query, a device may process the input and thereafter output, if available, a corresponding answer.

BRIEF SUMMARY

In summary, one aspect provides a method, comprising: receiving, at an audio input device associated with an information handling device, an audible user query; identifying, using a processor, syntactic aspects of the audible user query; determining, based at least in part on the syntactic aspects and regardless of whether a trained answer to the audible user query is available, an answer responsive to the audible user query; and providing, using an output device associated with the information handling device, the answer.

Another aspect provides an information handling device, comprising: an audio input device; an output device; a processor; a memory device that stores instructions executable by the processor to: receive an audible user query; identify syntactic aspects of the audible user query; determine, based at least in part on the syntactic aspects and regardless of whether a trained answer to the audible user query is available, an answer responsive to the audible user query; and provide the answer.

A further aspect provides a product, comprising: a storage device that stores code, the code being executable by a processor and comprising: code that receives an audible user query; code that identifies syntactic aspects of the audible user query; code that determines, based at least in part on the syntactic aspects and regardless of whether a trained answer to the audible user query is available, an answer responsive to the audible user query; and code that provides the answer.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
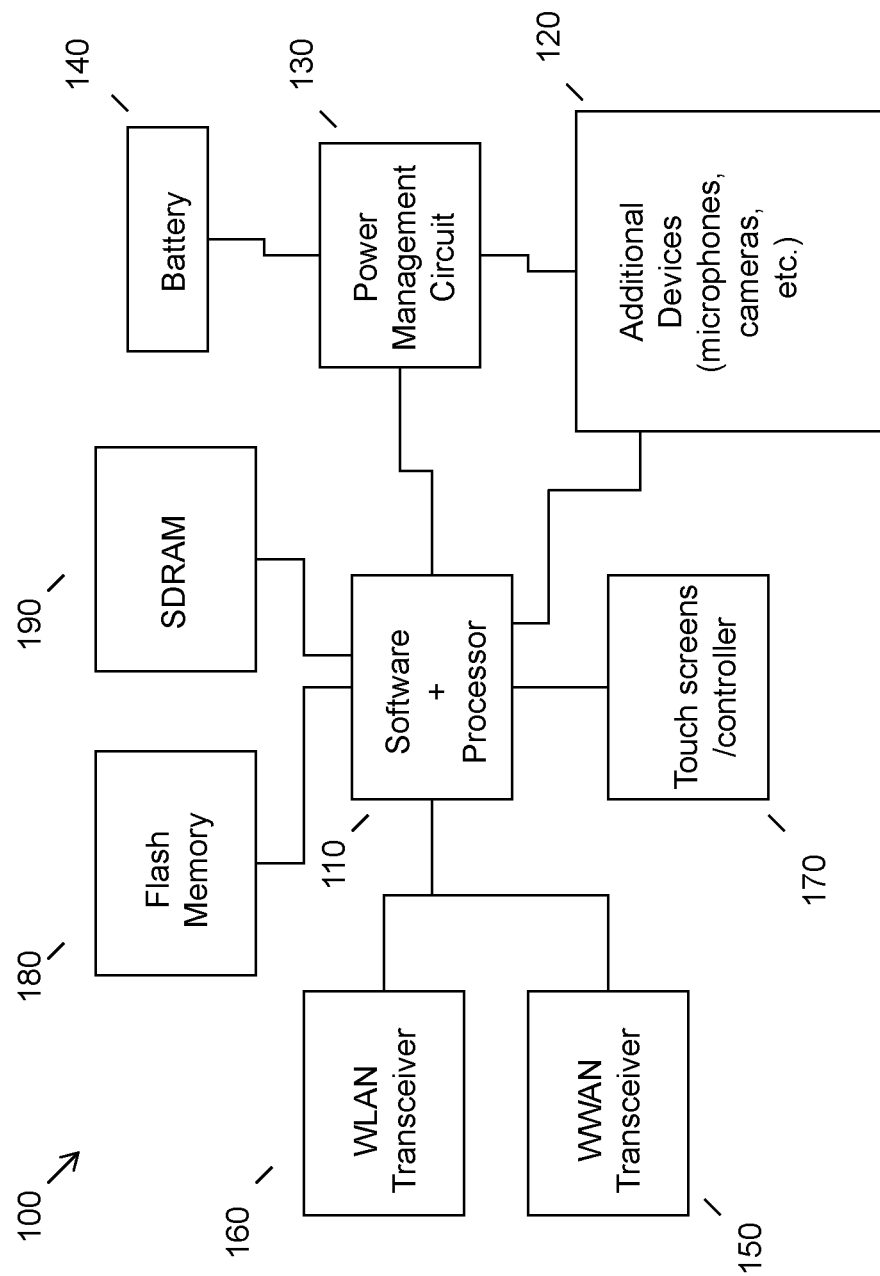
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventional digital assistants provide answers to user queries in a static and unoriginal way. Stated differently, there is no discourse variety in the answers that these digital assistants provide. For example, responsive to receiving a user query, a conventional digital assistant may regurgitate a trained answer each time the same, or substantially similar, user query is detected. Additionally, if the knowledge source of the digital assistant does not contain an appropriate answer to the user's query, a conventional output response may be relatively robotic, such as "I'm sorry, I can't help you with that". The foregoing limitations make interaction with conventional digital assistants unnatural, inhuman, and canned.

In an attempt to make interaction with digital assistants more natural, existing solutions may alter the way in which trained and/or predetermined output is provided. For example, responsive outputs may be provided in an accent familiar to, or preferred by, the user. Additionally or alternatively, as another example, the output speed may be dynamically adjusted based upon an age of a user (e.g., slowed down for senior or foreign language users, etc.). However, with these conventional methods the content of the output remains substantially the same and the user experience remains unnatural and robotic. Additionally, existing solutions fail to resolve the situations in which an answer to a user query cannot be found. More particularly, even if a currently available digital assistant were connected to the world's best knowledge source, it would still be limited to answering queries that it had been trained to answer, and no more.

Accordingly, an embodiment provides a method for providing a responsive output based at least in part on syntactic aspects associated with a user input query and regardless of whether a trained answer is available. In an embodiment, an audible user query may be received at a device. An embodiment may then identify syntactic aspects associated with the audible user query (e.g., part of speech of each word in the query, a class type associated with audible user query as a whole, etc.) and determine, based at least in part on these syntactic aspects, an answer to the query. For example, an embodiment may utilize one or more words present in the user query in the answer. Additionally, the determination of the answer may be conducted regardless of whether or not a substantive answer is available. Responsive to determining an answer, an embodiment may output that answer to the user. Such a method therefore enables a system of the embodiments to respond to queries that it has not been trained for and with a more natural answer.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
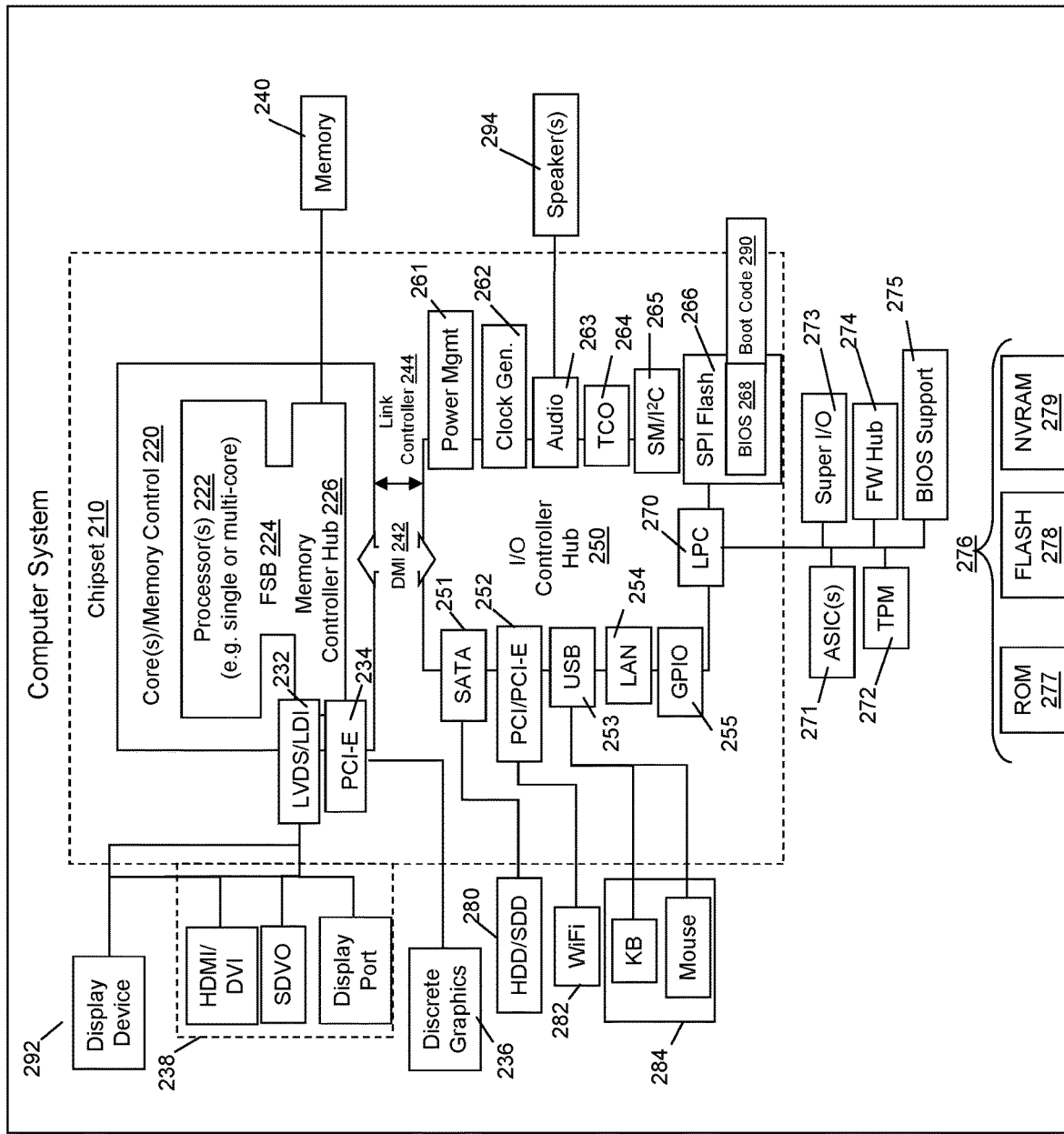
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of receiving audible user input, processing it, and thereafter providing audible output. For example, the circuitry outlined in FIG. 1 may be implemented in a smart phone or tablet embodiment, whereas the circuitry outlined in FIG. 2 may be implemented in a laptop.

Figure 3:
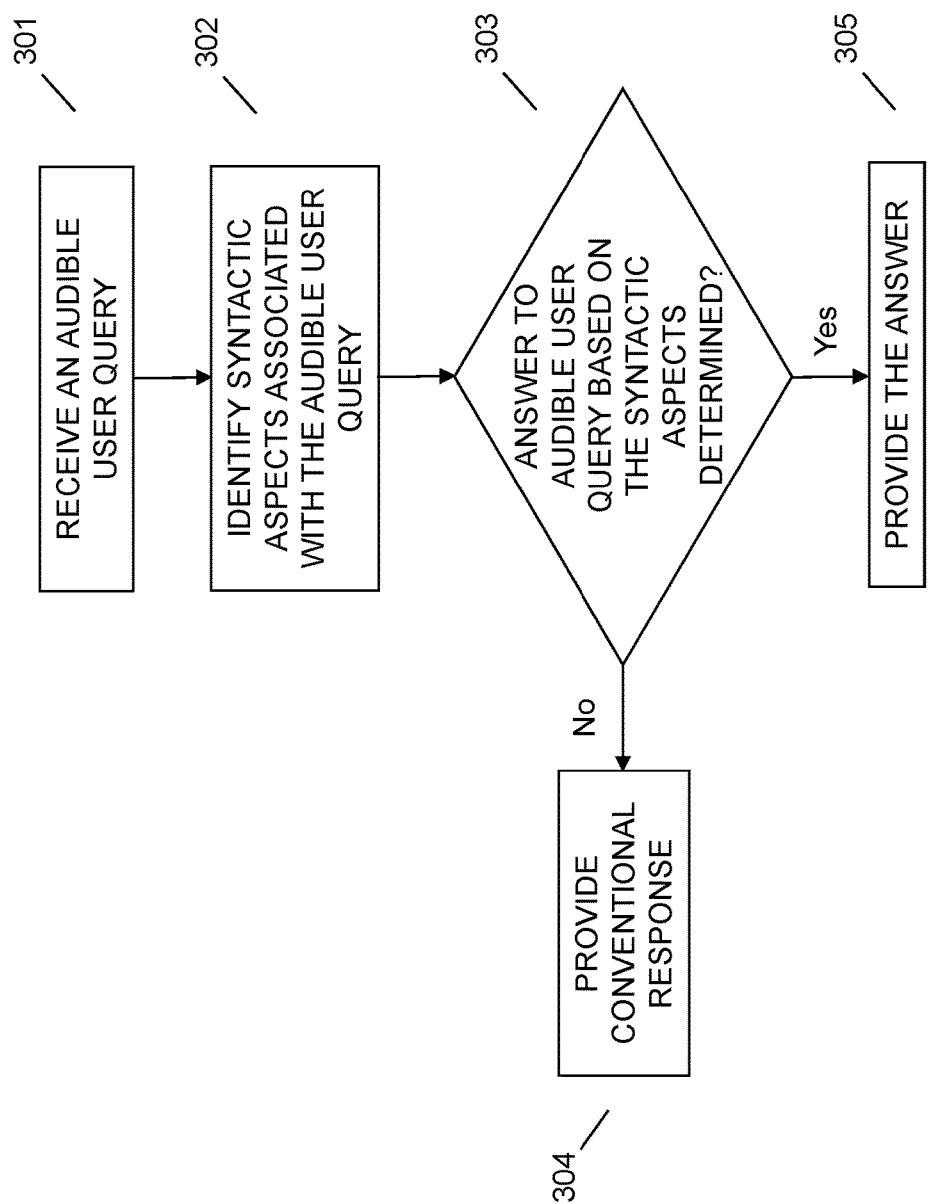
FIG. 3 illustrates an example method of providing a dynamic answer to an audible user query.

Referring now to FIG. 3, an embodiment provides a method for responding to user queries with dynamic answers. At 301, an embodiment may receive or detect an audible user query ("user query"). In an embodiment, the user query may be received at an audio input device (e.g., a microphone, etc.) integrally or operatively coupled to the device. In an embodiment, the user query may be either a directed query or a passive query. Regarding the former, a directed query may refer to a query intended to be provided by a user to a device (e.g., by provision of a wake word that address the device followed by the query, etc.). Regarding the latter, a passive audible query may refer to input not intended to be directed to a device (e.g., a query expressed by the user during a conversation with another individual but detected by the device, etc.).

At 302, an embodiment may identify one or more syntactic aspects associated with the user query. In the context of this application, a syntactic aspect may refer to one or both of the types of words utilized in the user query and a part of speech (e.g., noun, verb, pronoun, etc.) associated with each word. Regarding the latter, in an embodiment, words in the user query may be parsed and tagged with their appropriate part of speech ("POS"). The POS tagging may be implemented using one or more techniques known in the art. For instance, as a non-limiting example, POS tagging may be conducted by utilizing the Viterbi algorithm, which is a Markov-chain of probability distributions for the probability that word X is POS Y along with the probability that POS Y follows word X−1's POS.

As a non-limiting example of the foregoing concepts, short metadata tags may be associated with each word in the user query that identify the word's POS. These tags may be identified and accessed from an available knowledge source such as a POS corpus stored locally on the device or remotely on another device. For instance, the Penn Treebank Project contains a POS corpus of 36 tags associated with different parts of speech. For example, WDT corresponds to a Wh-determiner; VBZ corresponds to a verb, $3^{rd}$ person singular present; DT corresponds to a determiner; NN corresponds to a noun, singular or mass; IN corresponds to a preposition or subordinating conjunction; NNP corresponds to a proper noun, singular, etc. Accordingly, each word in a given user query may be associated with one of these tags. For example, the user query "What is the capital of North Carolina" may be parsed and tagged in the following way: What/WH is/VBZ the/DT capital/NN of/IN North Carolina/NNP.

At 303, an embodiment may determine an answer responsive to the user query based at least in part on one or more of the identified syntactic aspects of the user query. In an embodiment, the answer may be a natural and dynamic answer that is shaped, in part, by the user query. Stated differently, the answer may be representative of an answer that a user may receive in discourse with another individual. In an embodiment, the answer may be a substantive answer (i.e., that provides the user with the information that they requested in their user query) or may be an adaptive default answer (i.e., that provides the user with an indication that the information they requested could not be obtained).

The embodiments described herein may mimic, to a degree, the way humans produce speech in natural discourse. More particularly, for a given question in a conversation, an individual may provide a responsive answer a plurality of different ways, all of which may be appropriate. For example, for the question, "How old are you?", a first answer may be "I'm 10", another answer may be "I am 10", and a third answer may be "I turned 10 last month", all of which are fine. From the foregoing, given a user query that has been tagged with POS data, it may be found that certain sequences of POS are more likely to follow other sequences of POS than others. For example, the POS-tagged question, "How/WH old/JJ are/VB you/PRP", will likely be followed by one of the following POS answer sequences: PRP/VB/CD/NN, PRP/VBP/DT/JJ/CD/NN, etc. Associating these probable POS sequences with a practical response may produce answers such as: "I/PRP turn/VB 10/CD tomorrow/NN" and "I/PRP turned/VBP the/DT big/JJ 21/CD yesterday/NN".

Accordingly, using the foregoing probabilities, an embodiment may be able to produce dynamic answers to given user queries. For substantive answers, an embodiment may be able to identify the POS of the substance and thereafter incorporate the substantive material into a probable POS answer sequence. Additionally or alternatively, an embodiment may be able to utilize words from the user query in the answer. For example, if an embodiment does not know the answer to the user query "What is the commute time to Morrisville", instead of providing a conventional default statement such as "I'm sorry, I cannot help you with that", an embodiment may be able to provide a more natural default answer statement such as "I don't know the commute time to Morrisville".

As briefly mentioned above, a listing of one or more potential POS sequences may be available for any given user query. For example, available answers to the user query "What is the capital of North Carolina" may include: "The/DT capitol/NN of/IN North Carolina/NP is/VBZ Raleigh/NN"; "Raleigh/NNP is/VBZ the/DT capital/NN of/IN North Carolina/NNP"; "Raleigh/NNP"; "North Carolina's/NNP capitol/NN is/VBZ Raleigh/NNP", etc. In an embodiment, the content and/or length of the answer may be influenced by additional available context data. Stated differently, the selection and/or manipulation of a potential POS sequence may be influenced by available context data. For instance, if a volume level of ambient sound in the query input space is very loud, an embodiment may choose a short POS sequence that conveys the desired subject matter in a simple manner that is easy to hear and understand. As an example response to the query above, an embodiment may choose the shortest answer (i.e., "Raleigh"). In another situation, if a user has provided the same or similar query multiple times, or more than a predetermined threshold amount of times (e.g., 2 times, 3 times, etc.), an embodiment may simplify their answer on a subsequent detection of that user query. For example, if the user has provided the query above three times within a predetermined time period (e.g., 1 hour, 1 day, etc.), an embodiment may provide a longer POS sequence answer in the first few responses (e.g., "The capitol of North Carolina is Raleigh", etc.) and thereafter provide a shortened POS answer sequences in subsequent responses (e.g., "Raleigh", etc.).

In an embodiment, the user query may be classified and associated with a particular class type. The class type may provide one or more contextual indications regarding the user query. For example, an embodiment may be able to classify the user query as very formal or informal based upon the POS of the user query. This classification data may be utilized, at least in part, to determine a form of the answer. For example, given a user query classified as informal, an embodiment may choose, from a listing of expected POS answer sequences, the answer associated with the least formal POS sequence.

Responsive to not determining, at 303, an answer to the user query utilizing, at least partially, the syntactic aspects of the user query, an embodiment may, at 304, take no additional action. Alternatively, an embodiment may simply provide a conventional default response as known in the art. Conversely, responsive to determining, at 303, an answer to the user query utilizing, at least partially, the syntactic aspects of the user query, an embodiment may, at 305, provide the answer. The answer may be provided using any conventional output process available to the device (e.g., audible output using one or more speakers associated with the device, visual output presented on a display screen of the device, etc.).

The various embodiments described herein thus represent a technical improvement to conventional methods for responding to user queries. Using the techniques described herein, an embodiment may receive an audible query from a user. An embodiment may then identify a syntactic aspect associated with the user query (e.g., a POS associated with each word in the user query, etc.) and determine, based on one or more of these syntactic aspects, an answer to the user query. The framing of the answer may be associated with an expected POS answer sequence that is influenced by the POS sequence of the user query. Accordingly, a dynamic answer may be created, regardless of whether a trained answer to the user query is available or identified. Responsive to determining an answer, an embodiment may thereafter provide that answer to the user. Such a method may enable devices, or digital assistants resident on devices, to dialogue outside of their pre-set domains.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an audio input device associated with an information handling device, an audible user query at a digital assistant of the information handling device;
   identifying, using a processor, syntactic aspects of the audible user query;
   determining, based at least in part on the syntactic aspects and regardless of whether a trained answer to the audible user query is available, an answer responsive to the audible user query, wherein the determining the answer comprises determining a length of the answer based on additional context data, wherein the additional context data corresponds to a number of previously provided answers responsive to the audible user query and wherein the determining further comprises shortening the length of the answer responsive to detecting that the number of previously provided answers exceeds a predetermined threshold number; and
   providing, using an output device associated with the information handling device, the answer by the digital assistant.

2. The method of claim 1, wherein the answer comprises one or more words utilized in the audible user query.

3. The method of claim 1, wherein the additional context data corresponds to a volume level of ambient sound and wherein the determining further comprises shortening the length of the answer responsive to detecting that the volume level of the ambient sound is greater than a predetermined threshold.

4. The method of claim 1, wherein the identifying the syntactic aspects comprise identifying a part of speech associated with each word in the audible user query.

5. The method of claim 4, wherein the determining comprises predicting at least one word utilized in the answer based on the identified part of speech for each word in the audible user query.

6. The method of claim 4, wherein the determining the answer comprises:
   identifying a list of potential answers based on the part of speech associated with each word in the audible user query; and determining, using a ranking technique, the answer from the potential answers.

7. The method of claim 4, further comprising identifying, based on the identified part of speech associated with each word, a class associated with the audible user query.

8. The method of claim 7, wherein the determining comprises determining words utilized in the answer based at least in part on the identified class.

9. An information handling device, comprising:
an audio input device;
an output device;
a digital assistant;
a processor operatively coupled to the audio input device, the output device, and the digital assistant;
a memory device that stores instructions executable by the processor to:
receive, at the audio input device, an audible user query at the digital assistant;
identify syntactic aspects of the audible user query;
determine, based at least in part on the syntactic aspects and regardless of whether a trained answer to the audible user query is available, an answer responsive to the audible user query, wherein to determine the answer comprises determining a length of the answer based on additional context data, wherein the additional context data corresponds to a number of previously provided answers responsive to the audible user query and wherein the determining further comprises shortening the length of the answer responsive to detecting that the number of previously provided answers exceeds a predetermined threshold number; and
provide, using the output device, the answer by the digital assistant.

10. The information handling device of claim 9, wherein the answer comprises one or more words utilized in the audible user query.

11. The information handling device of claim 7, wherein the additional context data corresponds to a volume level of ambient sound and wherein the instructions executable by the processor to determine further comprise instructions executable by the processor to shorten the length of the answer responsive to detecting that the volume level of the ambient sound is greater than a predetermined threshold.

12. The information handling device of claim 9, wherein the instructions executable by the processor to identify the syntactic aspects comprise instructions executable by the processor to identify a part of speech associated with each word in the audible user query.

13. The information handling device of claim 12, wherein the instructions executable by the processor to determine comprise instructions executable by the processor to predict at least one word utilized in the answer based on the identified part of speech for each word in the audible user query.

14. The information handling device of claim 12, wherein the instructions executable by the processor to determine the answer comprise instructions executable by the processor to:
identify a list of potential answers based on the part of speech associated with each word in the audible user query; and
determine, using a ranking technique, the answer from the potential answers.

15. The information handling device of claim 12, wherein the instructions are further executable by the processor to:
identify, based on the identified part of speech associated with each word, a class associated with the audible user query; and
determine words utilized in the answer based at least in part on the identified class.

16. A product, comprising:
a storage device that stores code, the code being executable by a processor and comprising:
code that receives, at an audio input device associated with an information handling device, an audible user query at a digital assistant of the information handling device;
code that identifies syntactic aspects of the audible user query;
code that determines, based at least in part on the syntactic aspects and regardless of whether a trained answer to the audible user query is available, an answer responsive to the audible user query, wherein the code that determines the answer comprises code that determines a length of the answer based on additional context data, wherein the additional context data corresponds to a number of previously provided answers responsive to the audible user query and wherein the determining further comprises shortening the length of the answer responsive to detecting that the number of previously provided answers exceeds a predetermined threshold number; and
code that provides, using an output device, the answer by the digital assistant.

* * * * *